(12) United States Patent
Shan

(10) Patent No.: US 11,905,124 B2
(45) Date of Patent: Feb. 20, 2024

(54) SORTER

(71) Applicant: BEIJING JINGDONG QIANSHI TECHNOLOGY CO., LTD., Beijing (CN)

(72) Inventor: Wenjun Shan, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 248 days.

(21) Appl. No.: 17/603,582

(22) PCT Filed: Mar. 11, 2020

(86) PCT No.: PCT/CN2020/078825
§ 371 (c)(1),
(2) Date: Oct. 14, 2021

(87) PCT Pub. No.: WO2020/211575
PCT Pub. Date: Oct. 22, 2020

(65) Prior Publication Data
US 2022/0204283 A1 Jun. 30, 2022

(30) Foreign Application Priority Data
Apr. 17, 2019 (CN) .......................... 201910310328.6

(51) Int. Cl.
*B65G 47/46* (2006.01)
*B07C 5/36* (2006.01)
(Continued)

(52) U.S. Cl.
CPC ................ *B65G 47/46* (2013.01); *B07C 5/36* (2013.01); *B65G 17/32* (2013.01); *B65G 35/02* (2013.01); *B65G 37/00* (2013.01); *B65G 47/44* (2013.01)

(58) Field of Classification Search
CPC ........ B65G 47/44; B65G 47/46; B65G 17/32; B65G 35/02; B65G 37/00; B07C 3/08; B07C 5/36
(Continued)

(56) References Cited

U.S. PATENT DOCUMENTS 3,017,985 A * 1/1962 Kiwi ...................... B65G 17/32
198/726
4,269,303 A * 5/1981 Cornell .................. B65G 37/00
198/817

(Continued)

FOREIGN PATENT DOCUMENTS

CN 106956887 A 7/2017
CN 106984550 A 7/2017
(Continued)

OTHER PUBLICATIONS

The International Search Report dated Apr. 29, 2020 for PCT international application No. PCT/CN2020/078825.
(Continued)

*Primary Examiner* — Leslie A Nicholson, III
(74) *Attorney, Agent, or Firm* — Qinghong Xu

(57) ABSTRACT

A sorter comprising: a rack; a track assembly comprising two ring-shaped tracks both installed on the rack, the tracks being respectively arranged in two mutually parallel vertical planes and being aligned with each other; a drive assembly comprising at least one sprocket sets that comprise a driving sprocket and a plurality of driven sprockets installed on the rack; at least one chain hooping on the driving sprocket and the driven sprockets and having the same shape as the tracks; an electric machine configured to drive the driving sprocket to rotate; a sorting cart comprising a carriage that is arranged between and slidably connected to the two ring-shaped tracks and is further hinged with the chain; a conveying assembly disposed above the carriage and carry and convey (Continued)

items, wherein a conveying direction of the conveying assembly is different from a moving direction of the sorting cart.

16 Claims, 14 Drawing Sheets

(51) Int. Cl.
*B65G 17/32* (2006.01)
*B65G 35/02* (2006.01)
*B65G 37/00* (2006.01)
*B65G 47/44* (2006.01)

(58) Field of Classification Search
USPC ......... 198/359, 370.01, 370.03, 370.06, 890, 198/890.1, 798, 813
See application file for complete search history.

(56) References Cited

U.S. PATENT DOCUMENTS

| | | | |
|---|---|---|---|
| 8,991,588 B2* | 3/2015 | Lahogue | B65G 17/32 198/474.1 |
| 9,394,110 B2* | 7/2016 | Robbin | B65B 35/243 |
| 9,550,626 B2* | 1/2017 | Parodi | B07C 3/08 |
| 10,549,929 B2* | 2/2020 | Bretz | B65G 47/962 |
| 2002/0070101 A1* | 6/2002 | Hicks | B65G 19/02 198/813 |
| 2016/0236870 A1 | 8/2016 | Parodi et al. | |
| 2019/0062075 A1* | 2/2019 | Bretz | B65G 17/066 |

FOREIGN PATENT DOCUMENTS

| | | |
|---|---|---|
| CN | 107202137 A | 9/2017 |
| CN | 206494458 U | 9/2017 |
| CN | 206827449 U | 1/2018 |
| CN | 108636815 A | 10/2018 |
| CN | 208268326 U | 12/2018 |
| CN | 109178810 A | 1/2019 |
| DE | 102012207007 A1 | 10/2013 |
| EP | 2295155 A1 | 3/2011 |
| JP | S57111657 U | 7/1982 |
| JP | S60173508 U | 11/1985 |
| JP | S63196405 A | 8/1988 |
| JP | H02066513 U | 5/1990 |
| JP | H04317920 A | 11/1992 |
| JP | H08026444 A | 1/1996 |
| JP | H10067425 A | 3/1998 |
| JP | 2008044400 A | 2/2008 |

OTHER PUBLICATIONS

The First Notice Action dated Mar. 28, 2022 for Chinese Patent No. 201910310328.6.
Notice of Reasons for Refusal dated Dec. 6, 2022 of Japanese Application No. 2021-561842.

* cited by examiner

US 11,905,124 B2

SORTER

CROSS-REFERENCE TO RELATED APPLICATIONS

The present application is the U.S. national phase application of International Application No. PCT/CN/2020/078825, filed on Mar. 11, 2020, which claims priority to Chinese Patent Application No. 201910310328.6, titled "SORTER" filed with China National Intellectual Property Administration on Apr. 17, 2019, the contents of which are incorporated herein by reference in its entireties.

TECHNICAL FIELD

The present disclosure generally relates to the field of logistics technology, and specifically relates to a sorter.

BACKGROUND

There are mainly two types of existing cross-belt sorters, one is a ring-type cross-belt sorter, and the other is a linear cross-belt sorter.

The ring-type cross-belt sorter is arranged in a horizontal ring structure on the ground, which covers a large area. The linear cross-belt sorter has a straight structure as a whole, which can only transport packages from a front end to a tail end of the sorter. The packages rust be unloaded before being conveyed to the tail end of the sorter, but if some packages cannot be unloaded due to the closing of one destination box, these packages had to be unloaded and waited for re-sorting. Especially, after a sorting cart of the linear cross-belt sorter runs to the tail end of the sorter, the linear cross-belt sorter needs run to the bottom of the sorting cart for recycling packages, but the sorting cart will be completely turned over and cannot carry packages, so this section, i.e. the tail end of the sorter, cannot be used, resulting in a low utilization rate.

The above-mentioned information disclosed in the background section is only for enhancing the understanding of the background of the present disclosure, so it may include information that does not constitute the prior art known to those of ordinary skill in the art.

SUMMARY

A main purpose of the present disclosure is to overcome at least one of the above-mentioned drawbacks of the prior art and provides a sorter. The sorter may include:
  a rack;
  a track assembly comprising two ring-shaped tracks both installed on the rack, the two ring-shaped tracks being respectively arranged in two mutually parallel vertical planes, and being aligned with each other;
  a drive assembly, which includes:
    at least one sprocket set comprising a driving sprocket and a plurality of driven sprockets installed on the rack;
    at least one chain hooping on the driving sprocket and the plurality of driven sprockets and consistent with a shape of the ring-shaped tracks;
    an electric machine configured to drive the driving sprocket to rotate;
  a sorting cart, which includes:
    a carriage arranged between the two ring-shaped tracks and slidably connected to the two ring-shaped tracks and being further hinged with the chain;
    a conveying assembly disposed above the carriage and configured to carry and convey packages,
    wherein a conveying direction of the conveying assembly is different from a moving direction of the sorting cart.

According to one embodiment of the present disclosure, the chain is located between the two ring-shaped tracks and in a vertical plane parallel to the two ring-shaped tracks.

According to one embodiment of the present disclosure, the carriage may include a carriage body that carries the conveying assembly and at least two support arms that respectively arranged on both sides of the carriage body, wherein each of the support arms may include:
  a guide-wheel group;
  a hinge rod extends from a side of the carriage body in a direction away from the carriage body; and
  a connecting rod having one end connected to a top end of the hinge rod and other end connected to the guide-wheel group, and being perpendicular to the hinge rod; wherein two guide-wheel groups respectively travel along the two ring-shaped tracks, the hinge rod passes through the chain and rotates relative to the chain, and the chain drives the carriage to slide along the ring-shaped tracks by pulling the hinge rod.

According to one embodiment of the present disclosure, two sets of the at least one sprocket set are provided and two chains of the at least one chains are provided;
  the two chains are respectively arranged on the two sets of sprocket set, and are respectively located on two sides of the carriage body:
    each of two hinge rods passes through a corresponding chain, and rotates relative to the corresponding chain that it passes through;
    the two chains synchronously and respectively pull the two hinge rods to drive the carriage to slide along the ring-shaped tracks.

According to one embodiment of the present disclosure, the hinge rod connects two adjacent chain links in the chain.

According to one embodiment of the present disclosure, each of the two ring-shaped tracks is provided with a ring-shaped strip groove with openings facing each other;
  the guide-wheel group ray include a first guide-wheel and a second guide-wheel that are coaxially arranged;
  wherein the first guide-wheel rolls along an upper guide wall of the ring-shaped strip groove, and the second guide-wheel rolls along a lower guide wall of the ring-shaped strip groove.

According to one embodiment of the present disclosure, a diameter of the first guide-wheel is greater than a diameter of the second guide-wheel, and a height of the lower guide wall of the ring-shaped strip groove is smaller than a height of the upper guide wall of the ring-shaped strip groove so that the lower guide wall gives a place to the first guide-wheel.

According to one embodiment of the present disclosure, the drive assembly further includes a first pallet that has a shape of a straight strip and extends in a horizontal direction, and the first pallet is arranged below a horizontally extending portion of the chain.

According to one embodiment of the present disclosure, the drive assembly further comprises a second pallet that has a shape of a straight strip and extends in a vertical direction, and the second pallet is arranged on an inner side of a vertically extending portion of the chain.

According to one embodiment of the present disclosure, the rack may include two frames separated from each other; wherein two sides of ring-shaped tracks are respectively installed on the two frames, and sprockets in the sprocket set are evenly distributed on the two frames.

According to one embodiment of the present disclosure, the driven sprockets in the two sets of sprocket set are aligned with each other; the driving sprockets in the two sets of sprocket set are aligned with each other, and two driving sprockets are connected with each other by a shaft.

According to one embodiment of the present disclosure, the sprocket set further includes a tensioning member installed on the frame, a bearing seat installed on the tensioning member, and a third bearing installed on the bearing seat;

wherein a rotating shaft of at least one driven sprocket is inserted into an inner ring of the third bearing;

wherein the tensioning member may include:

two straight sliding tracks parallel to each other, the bearing seat being disposed between the two straight sliding tracks and slide along the straight sliding tracks;

a connecting member having a screw hole, and the connecting member configured to connect the two straight sliding tracks;

a tensioning bolt parallel to the straight sliding tracks, the tensioning bolt being threaded fitted with the screw hole and being rotatable connected to the bearing seat.

According to one embodiment of the present disclosure, a plurality of sorting carts are disposed; and the ring-shaped tracks are full of the plurality of sorting carts.

According to one embodiment of the present disclosure, the sorter further includes a plurality of sliding chutes arranged on a side of the ring-shaped tracks facing away from the sorting cart; and the plurality of sliding chutes are arranged along a extending direction of the ring-shaped track.

BRIEF DESCRIPTION OF THE DRAWINGS

By considering the following detailed description of the preferred embodiments of the present disclosure in conjunction with the accompanying drawings, various objectives, features and advantages of the present disclosure will become more apparent. The drawings are merely exemplary illustrations of the present disclosure and are not necessarily drawn to scale. In the drawings, the same reference numerals always refer to the same or similar parts.

Figure 1:
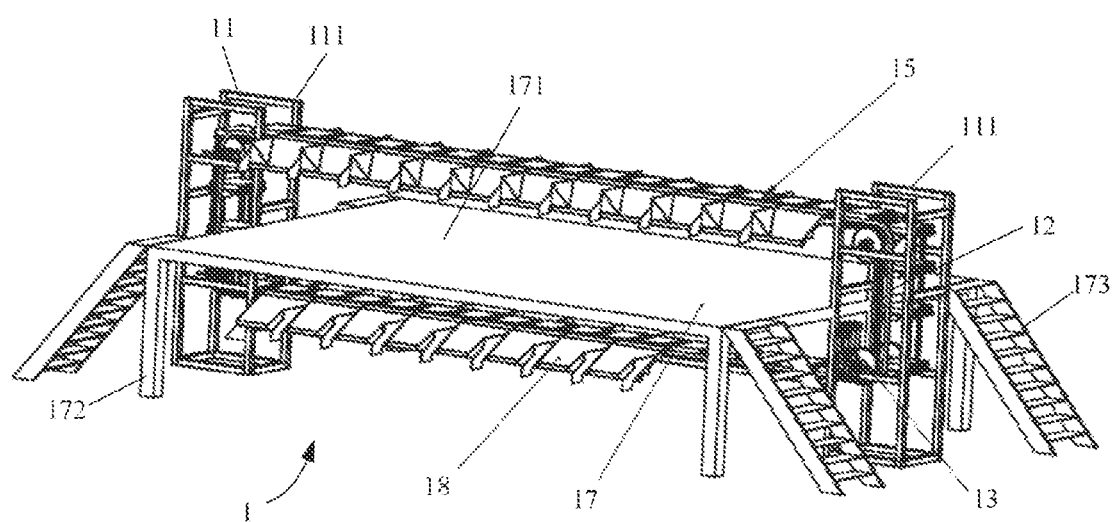
FIG. 1 is a three-dimensional schematic diagram showing a sorter according to an exemplary embodiment.

Wherein, the reference signs are explained as follows:

1 sorter; 11 rack; 111 frame; 12 track assembly; 121 ring-shaped track; 122 vertical track; 123 transverse track; 124 arc track; 125 ring-shaped strip groove; 126 upper guide wall; 127 lower guide wall; 13 drive assembly; 131 chains; 132 driven sprocket; 133 driving sprocket; 134 electric machine; 135 speed reducer; 136 first pallet; 137 second pallet; 138 bearing seat; 139 tensioning member; 140 straight slide track, 141 connecting member; 142 tensioning bolt; 143 shaft; 148 third bearing; 149 sprocket set; 15 sorting car; 151 conveying assembly; 152 carriage; 153 driven roller; 154 driving roller; 155 belt; 156 carriage body; 157 supporting arm; 158 connecting rod; 159 hinging rod; 160 guide-wheel group; 161 first guide-wheel; 162 second guide-wheel; 163 core shaft; 164 first bearing; 165 second bearing; $1^7$ platform; 171 top plate; 172 upright post; 173 ladder; 18 sliding chute.

DETAILED DESCRIPTION

Example embodiments will now be described more fully with reference to the accompanying drawings. However, the example embodiments can be implemented in various forms, and should not be construed as being limited to the embodiments set forth herein; on the contrary, these embodiments are provided so that the present disclosure will be comprehensive and complete, and fully convey the concept of the example embodiments to those skilled in the art. The same reference numerals in the figures indicate the same or similar structures, and thus their detailed descriptions will be omitted.

Figure 2:
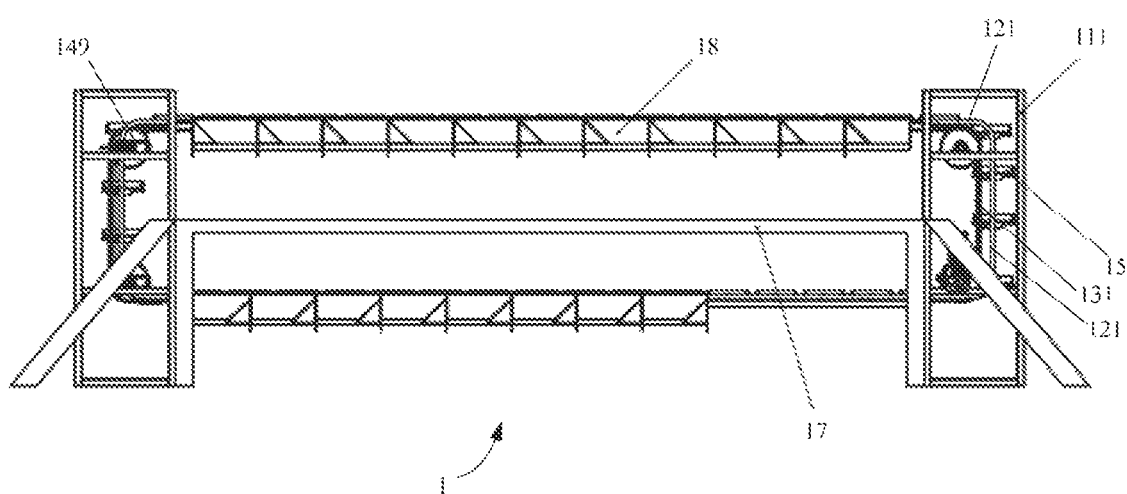
FIG. 2 is a schematic front view of a sorter according to an exemplary embodiment.
Figure 3:
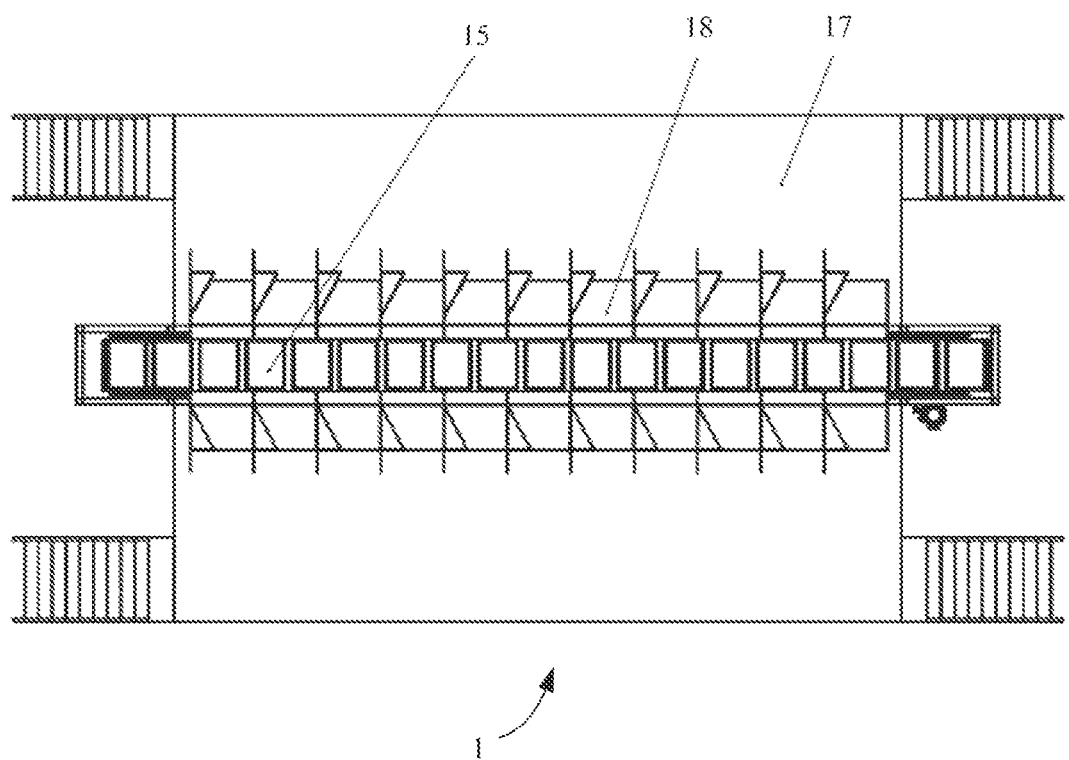
FIG. 3 is a schematic top view of a sorter according to an exemplary embodiment.

FIGS. 1 to 3 show a sorter according to some embodiments. Referring to FIGS. 1 to 3, the sorter 1 includes a rack 11, a track assembly 12, a drive assembly 13, and a sorting cart 15. The track assembly 12 and the drive assembly 13 are both installed on the rack 11, and the sorting cart 15 is connected to the track assembly 12 and the drive assembly 13.

In this embodiment, the rack 11 includes two frames 111. The two frames 111 are separated from each other. The frame 111 extends in a vertical direction as a whole and has a substantially rectangular structure. The frame 111 includes a plurality of vertical rods and a plurality of transverse rods. The vertical rods are all vertically arranged, and the transverse rod connects two adjacent vertical rods together. Both transverse rods and vertical rods can be made of metal materials.

Figure 4:
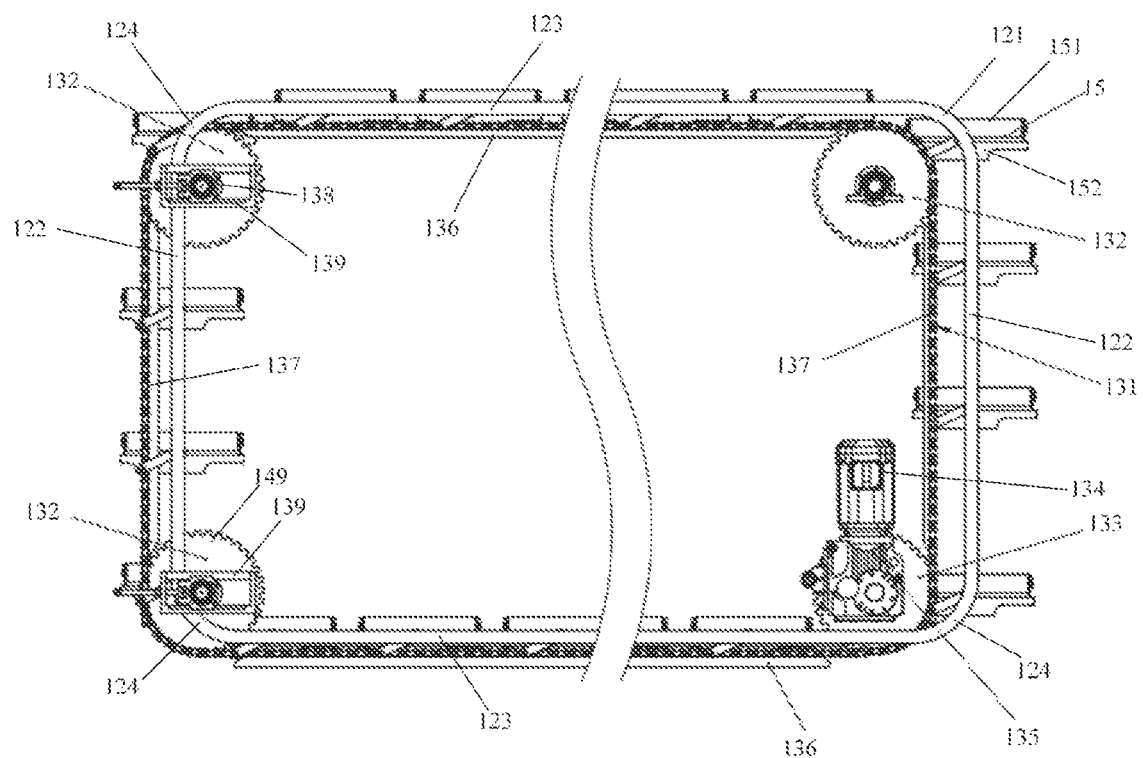
FIG. 4 is a schematic diagram showing the cooperation of a track assembly, a drive assembly and a sorting cart according to an exemplary embodiment.
Figure 5:
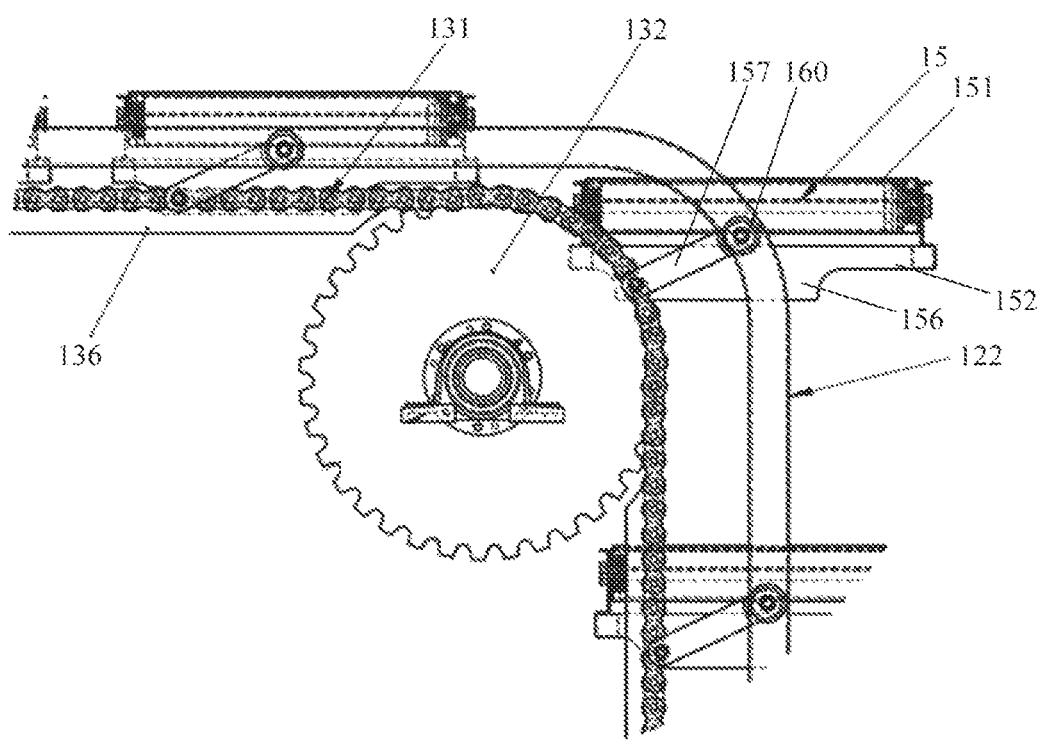
FIG. 5 is a partial enlarged view of FIG. 4.

Referring to FIGS. 4 and 5, the track assembly 12 includes two ring-shaped tracks 121. The two ring-shaped tracks 121 are arranged in two mutually parallel vertical planes, and the two ring-shaped tracks 121 are also aligned with each other. The ring-shaped track 121 may be set to be roughly rectangular, and an arc transition is adopted at each corner. The ring-shaped track 121 includes two transverse tracks 123, two vertical tracks 122, and four arc tracks 124. Both transverse tracks 123 and vertical tracks 122 extend along a straight line. The transverse tracks 123 are arranged horizontally, and the vertical tracks 122 are arranged vertically. Two transverse tracks 123 are parallel to each other, and one transverse track 123 is disposed below the other transverse track 123. The two vertical tracks 122 are respectively arranged at two ends of two transverse tracks 123. The arc track 124 is π/2. Four arc tracks are respectively arranged on each end of two transverse tracks 123. The arc track 124 connects an end of the transverse track 123 and an end of the vertical track 122 that are close to each other, and the arc track 124 is tangent to the transverse track 123 and the vertical track 122 connected to it, respectively. Two opposite sides of the ring-shaped track 121 are respectively connected to two frames 111, and the two frames 111 support the ring-shaped track 121.

The drive assembly 13 includes one or more sprocket sets 149, one or more chains 131 and an electric machine 134. The sprocket set 149 includes a driving sprocket 133 and a plurality of driven sprockets 132. A plurality of driven sprockets 132 are all installed on the rack 11. Both the driving sprocket 133 and the driven sprockets 132 can rotate around their own axes. The chain 131 is hooped on the driving sprocket 133 and the driven sprockets 132 so that the shape of the chain 131 is consistent with the shape of the ring-shaped track 121. In this embodiment, three driven sprockets 132 are provided, in which two driven sprockets 132 are disposed on one frame 111, and the last one driven sprocket 132 and driving sprocket 133 are disposed on another frame 111. The axes of the driving sprocket 133 and the driven sprockets 132 are all perpendicular to the ring-shaped track 121. The two sprockets on the same frame 111 are arranged vertically, and one of the sprockets is arranged right above the other sprocket. The chain 131 is hooped on three driven sprockets 132 and one driving sprocket 133. The shape of the chain 131 is consistent with the shape of the ring-shaped track 121, and the chain 131 is also located in a vertical plane. The chain 131 may be located between the two ring-shaped tracks 121. The ring-shaped track 121 is not aligned with the chain 131. Edges of ring-shaped track 121 are parallel to corresponding edges of chain 131. The electric machine 134 is used to drive at least one sprocket to rotate. The drive assembly 13 may also include a speed reducer 135, which driven-connects the electric machine 134 and the driving sprocket 133. The electric machine 134 and the driving sprocket 133 can be driven by the speed reducer 135.

Figure 6:
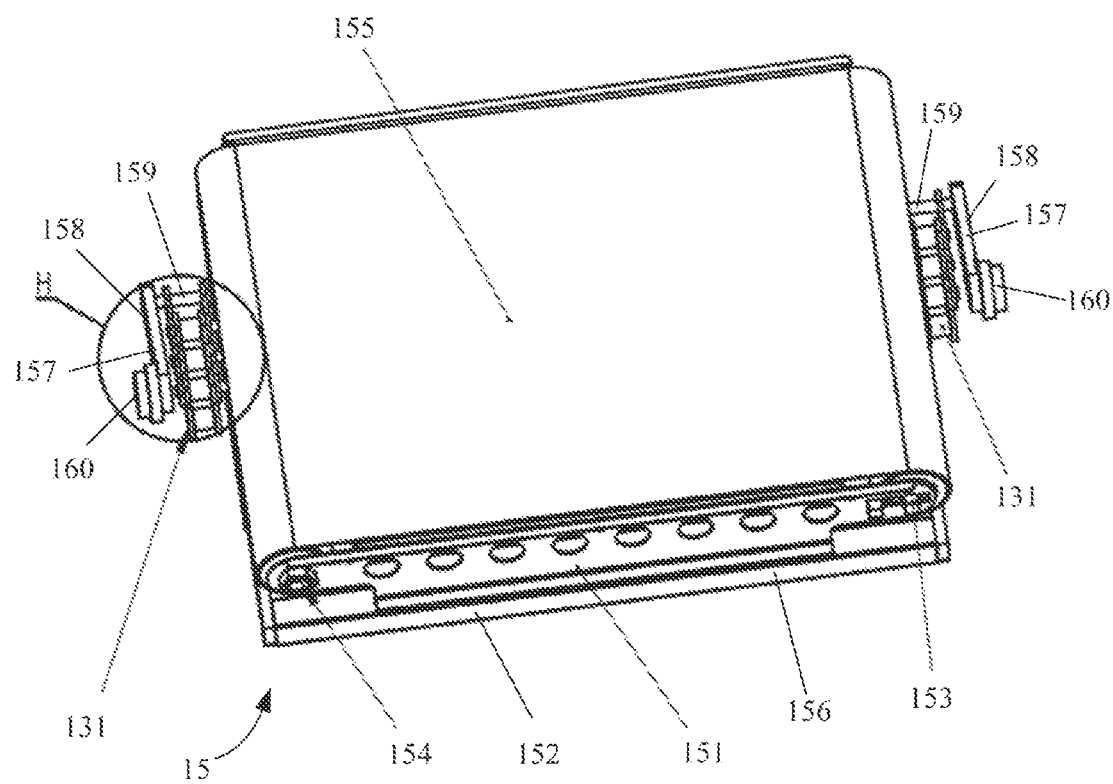
FIG. 6 is a three-dimensional schematic diagram showing a sorting cart according to an exemplary embodiment.
Figure 7:
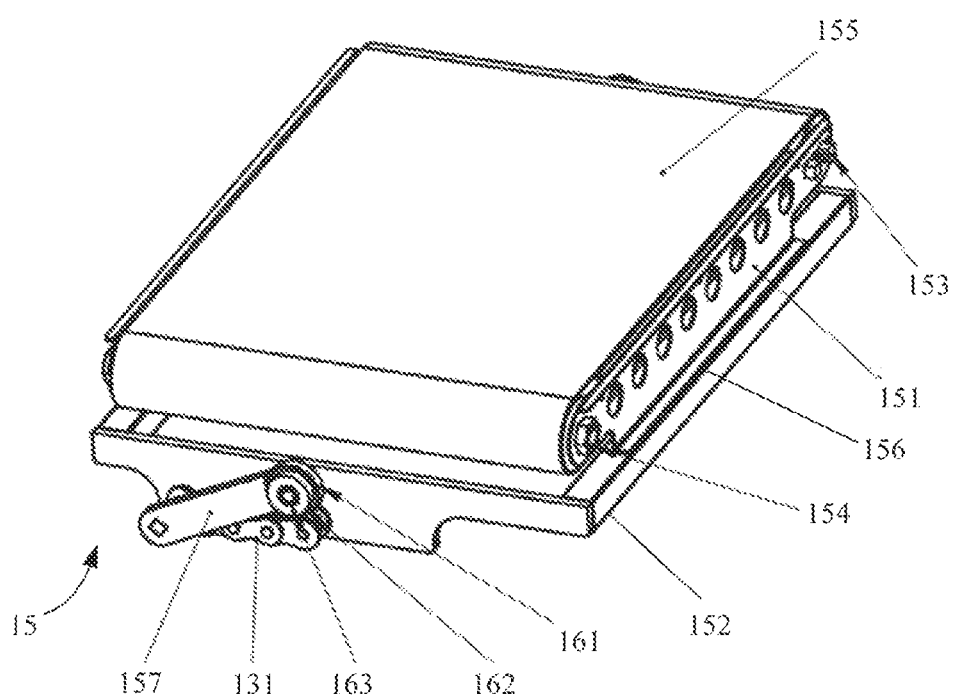
FIG. 7 is a three-dimensional schematic diagram showing a sorting cart according to an exemplary embodiment.
Figure 10:
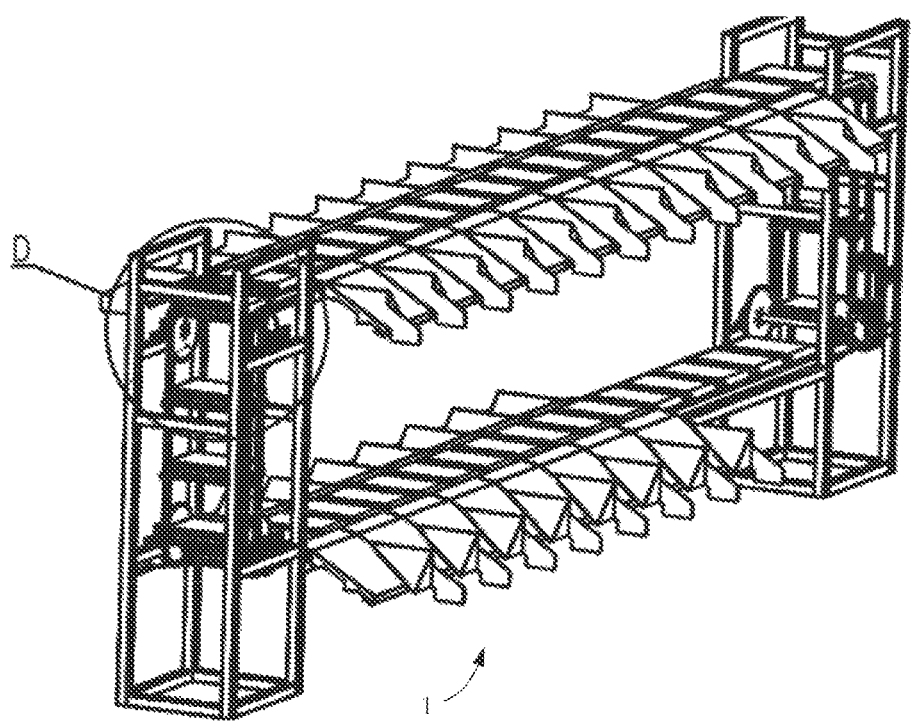
FIG. 10 is a three-dimensional schematic diagram showing a sorter according to an exemplary embodiment.

Referring to FIGS. 6 and 7, the sorting cart 15 includes a carriage 152 and a conveying assembly 151. The conveying assembly 151 is installed above the carriage 152 for carrying and conveying packages. The carriage 152 is arranged between the two ring-shaped tracks 121. Two sides of the carriage 152 are respectively slidably connected to the two ring-shaped tracks 121. The carriage 152 is also hinged with the chain 131. In this way, the sorting cart 15 is capable to slide along the ring-shaped tracks 121 under the drive of the chain 131. The conveying assembly 151 may be a conveyor, such as a belt conveyor. In this embodiment, the conveying assembly 151 includes a belt 155, a driving roller 154, a driven roller 153, and a motor. The driving roller 154 and the driven roller 153 are both installed on the carriage 152, and both can rotate around their own axes. The belt 155 is hooped on the driven roller 153 and the driving roller 154. The motor is used to drive the driving roller 154 to rotate, in order to drive the belt 155 to move. Packages are placed on the belt 155, and in case that the belt 155 is driven, the packages are delivered out. A conveying direction of the conveying component 151 is inconsistent with a moving direction of the sorting car 15, and the conveying component 151 is capable to convey packages to both sides of the sorting car 15. A plurality of sliding chutes 18 are also be provided on both sides of the two ring-shaped tracks as a whole, as shown in FIGS. 3 and 10, and each sliding chute 18 corresponds to a package destination.

When the electric machine 134 drives the driving sprocket 133 to rotate, the chain 131 is driven to rotate, and the chain 131 in turn drives the sorting cart 15 to slide along the ring-shaped track 121. When the sorting car 15 moves to a certain position, the packages are loaded on the sorting car 15. For example, a bag supply station is set beside the sorter 1. When the sorting car 15 moves near the bag supply station, the bag supply station delivers packages onto the sorting cart 15, and the conveying component 151 of the sorting cart 15 carries these packages. When the sorting car 15 moves packages along the ring-shaped track 121 to the vicinity of a predetermined sliding chute 18, a delivering assembly starts to put a corresponding package into the sliding chute 18, and the package falls into the sliding chute 18, and the sorting is completed.

The sorter 1 is arranged in a vertical ring shape as a whole, which makes full use of an upper space, and has a smaller footprint than the existing ring-shaped cross-belt sorter 1. Furthermore, the sorting cart 15 is restricted by the chain 131 and the ring-shaped track 121 to maintain a fixed posture, so that the sorting car 15 can always maintain the same posture during operation without turning over. The sorting car 15 can carry packages and run along the entire ring-shaped track 121, there is no need to unload packages at the tail end and the overall utilization rate is improved, compared with the existing linear cross-belt sorter 1.

Figure 8:
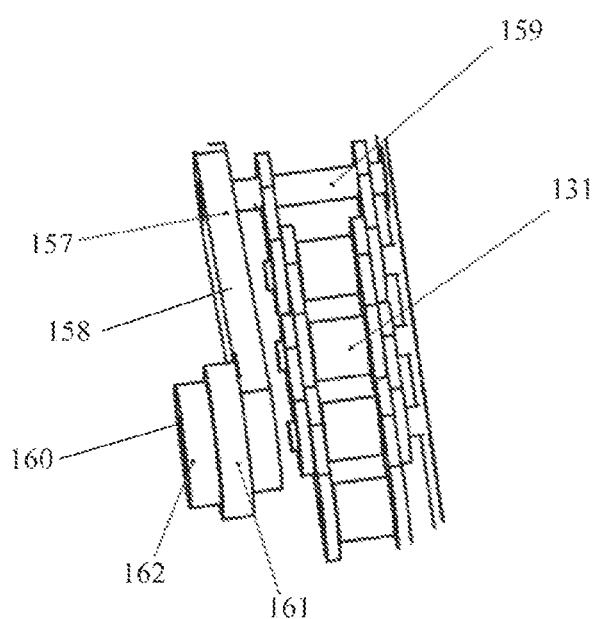
FIG. 8 is a partial enlarged view at H in FIG. 6.

Furthermore, referring to FIGS. 6 to 8, the carriage 152 includes a carriage body 156 and one or more support arm 157. The carriage body 156 has a substantially rectangular plate structure. The conveying assembly 151 is installed above the carriage body 156. The carriage body 156 is arranged horizontally. Two supporting arms 157 are provided, which are respectively disposed on opposite sides of the carriage body 156. Each of the supporting arms 157 includes a hinge rod 159, a connecting rod 158 and a guide-wheel group 160. The hinge rod 159 extends from the carriage body 156 in a direction away from the carriage body 156. The hinge rod 159 is hinged to the chain 131. The hinge rod 159 can be used as a pin shaft of the chain 131 to pass through the chain 131 so as to connect two adjacent chain links of the chain 131. The connecting rod 158 connects the hinge rod 159 and the guide-wheel group 160. One end of the connecting rod 158 is connected to a top end of the hinge rod 159, and the connecting rod 158 and the hinge rod 159 are preferably perpendicular to each other. The two connecting rods 158 are parallel to each other. The two guide-wheel groups 160 may respectively travel along the two ring-shaped tracks 121.

By using this arrangement, the chain 131 and the ring-shaped tracks 121 jointly lift the carriage body 156 through the support arms 157, and the chain 131 can also drive the carriage body 156 to move by pulling the support arms 157. At the same time, the chain 131 and the ring-shaped tracks 121 jointly constrain the support arms 157, so that the support arms 157 always maintains the same posture during operation, thereby keeping the posture of the carriage body 156 unchanged.

Figure 9:
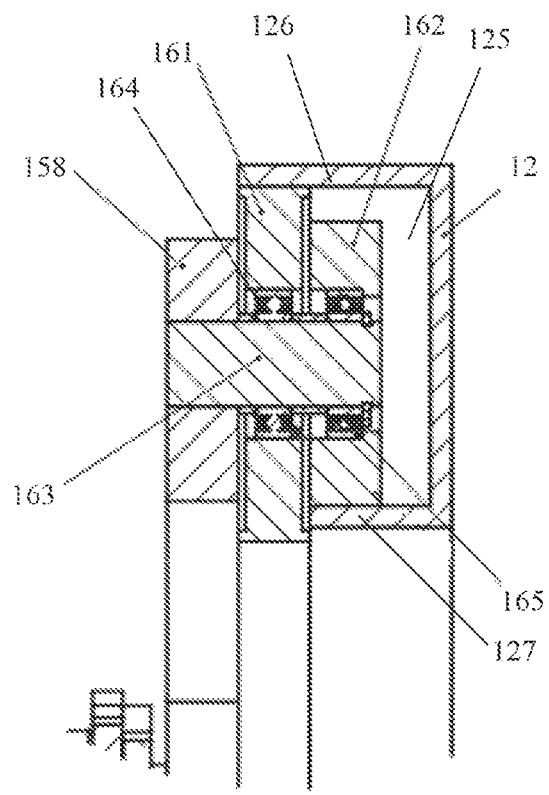
FIG. 9 is a schematic diagram showing the cooperation between a guide-wheel set and ring-shaped tracks according to an exemplary embodiment.

Further, referring to FIG. 9, a ring-shaped strip groove 125 is provided on the ring-shaped track 121. The openings of the ring-shaped strip grooves 125 of the two ring-shaped tracks 121 are arranged opposite to each other. The guide-wheel group 160 extends into the ring-shaped strip groove 125 and travels along the ring-shaped strip groove 125. The cross section of the ring-shaped track 121 may be C-shaped.

The guide-wheel group 160 includes a first guide-wheel 161 and a second guide-wheel 162. The first guide-wheel 161 and the second guide-wheel 162 are arranged coaxially. The guide-wheel group 160 may further include a core shaft 163, a first bearing 164 and a second bearing 165. The core shaft 163 is connected to the connecting rod 158 and perpendicular to the connecting rod 158. Both the first bearing 164 and the second bearing 165 are sleeved on the core shaft 163. The first guide-wheel 161 is installed on the first bearing 164, and the second guide-wheel 162 is installed on the second bearing 165. The first guide-wheel 161 and the second guide-wheel 162 can rotate along their own axes. The axes of the first guide-wheel 161 and the second guide-wheel 162 are both perpendicular to a vertical plane where the ring-shaped track 121 is located. The first guide-wheel 161 rolls along an upper guide wall 126 of the ring-shaped strip groove 125, and the second guide wheel 162 rolls along a lower guide wall 127 of the ring-shaped strip groove 125.

The first guide-wheel 161 and the second guide-wheel 162 can always abut against two side walls of the ring-shaped strip groove 125, so the combination of the guide-wheel group 160 and the ring-shaped track 121 is closer.

Further, the diameter of the first guide-wheel 161 is larger than the diameter of the second guide-wheel 162, and the first guide-wheel 161 is disposed between the second guide-wheel 162 and the connecting rod 158. The height of the lower guide wall 127 of the ring-shaped strip groove 125 is smaller than the height of the upper guide wall 126 of the ring-shaped strip groove 125. The height of the inner side of the ring-shaped strip groove 125 is lower, which gives a place to the first guide-wheel 161, so the arrangement is more reasonable.

Further, referring to FIG. 4, the drive assembly 13 further includes a first pallet 136 having a straight strip shape. The first pallet 136 is arranged horizontally. The first pallet 136 is fixed on the rack 11, and two ends of the first pallet 136 are respectively connected to the two frames 111. The first pallet 136 is disposed under a horizontally extending portion of the chain 131, and an extending direction of the first pallet 136 is the same as an extending direction of the chain 131. The first pallet 136 supports the chain 131 from below the chain 131. Two first pallet 136 can be provided, and the two first pallet 136 respectively support portions of the chain 131 located at the top region and the bottom region.

When the sorting cart 15 reaches the horizontal extending portion of the chain 131, downward pressure exerted by the supporting arms 157 on the chain 131 makes the chain 131 has a tendency of downward deformation. The first pallet 136 supports the chain 131 from the bottom of the chain 131 to offset the downward pressure. Therefore, the sorting car 15 can run more smoothly.

Further, the drive assembly 13 further includes a second pallet 137 having a straight strip shape. The second pallet 137 is vertically arranged. The second pallet 137 is installed on the rack 11. Two second pallets 137 may be provided, and the two second pallets 137 are respectively disposed on the two frames 111. The second pallet 137 is disposed on an inner side of a vertically extending portion of the chain 131 and arranged along an extending direction of the chain 131. The second pallet 137 is arranged close to the chain 131. The chain 131 can abut against one surface of the second pallet 137.

When the sorting cart 15 reaches the vertical section of the chain 131, lateral pressure exerted by the support arms 157 to the chain 131 makes the chain 131 has a tendency of inwardly deformation, and the second pallet 137 supports the chain 131 from the inner side of the chain 131 to offset the lateral pressure. Therefore, the sorting cart 15 will not shake under the driving of the chain 131.

Further, there are two sets of sprocket set 149 and two pieces of chain 131. The two chains 131 are respectively arranged on the two sets of sprocket set 149. The two chains 131 are respectively located in two mutually parallel vertical planes, and the two chains 131 are aligned with each other. The two chains 131 are respectively arranged on opposite sides of the sorting cart 15 and located between the two ring-shaped tracks 121. Two hinge rods 159 respectively pass through the two chains 131, and each of the two hinge rods 159 can rotate relative to the chain 131 which it passes through. In this way, the two chains 131 are hinged with the sorting cart 15 respectively.

Figure 11:
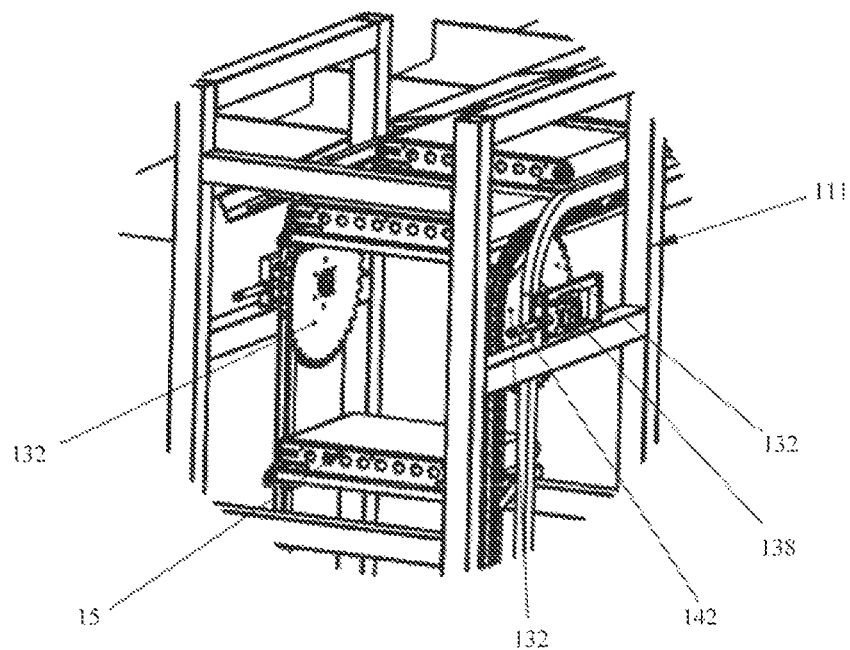
FIG. 11 is a partial enlarged view at D in FIG. 10.

Referring to FIGS. 10 and 11, the driven sprockets 132 in the two sets of sprocket set 149 are arranged in a one-to-one correspondence, and the two corresponding driven sprockets 132 are aligned with each other. In order to avoid interference with shafts of the sprockets when the sorting car 15 passes through sprocket regions, the two driven sprockets 132 aligned with each other are not connected by the shaft. The sorting cart 15 can smoothly pass through regions between the driven sprockets 132.

Figure 12:
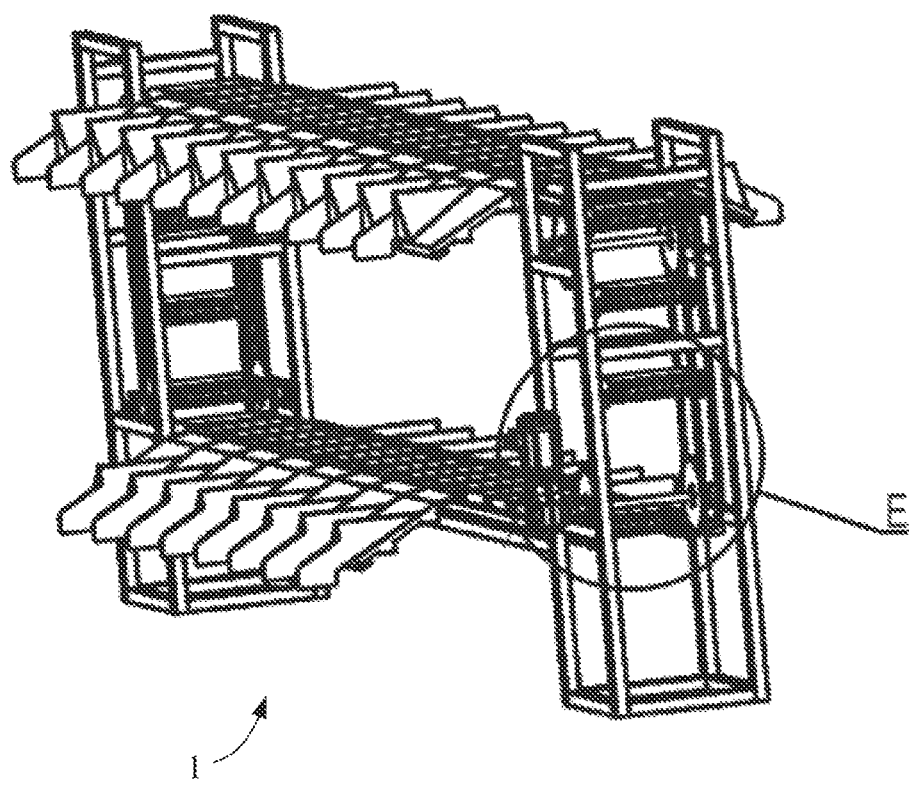
FIG. 12 is a three-dimensional schematic diagram showing a sorter according to an exemplary embodiment.
Figure 13:
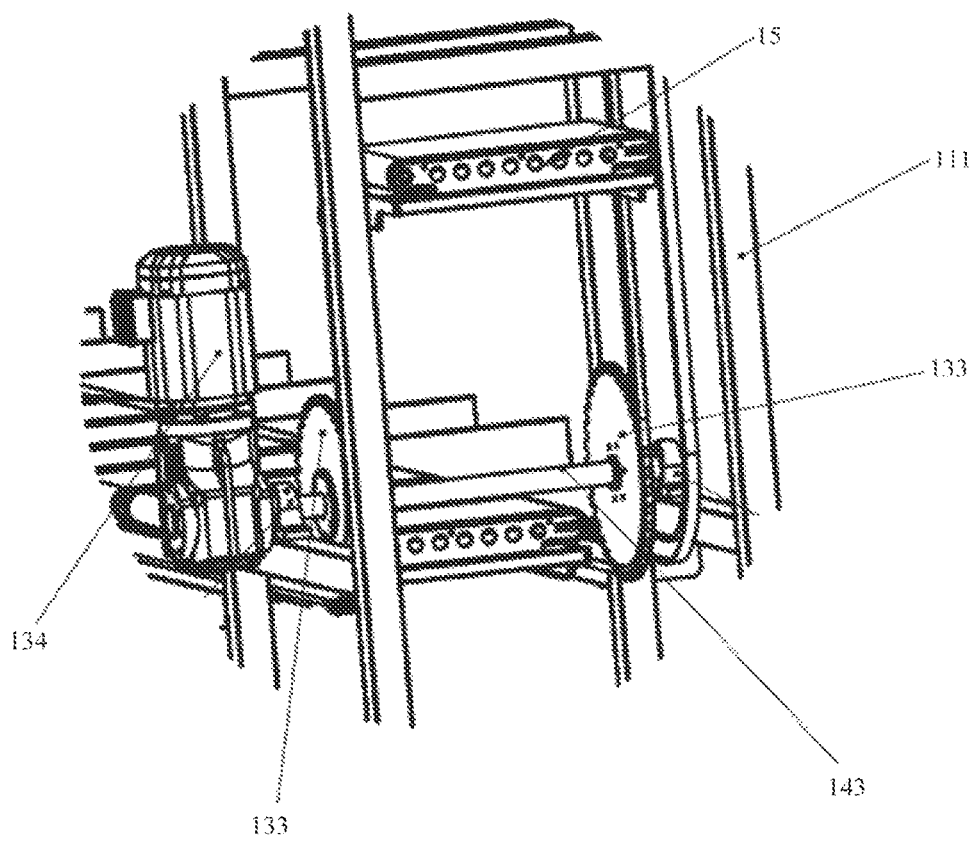
FIG. 13 is a partial enlarged view at E in FIG. 12.

Further, referring to FIGS. 12 and 13, the driving sprockets 133 in the two sets of sprocket set 149 are aligned with each other. The two driving sprockets 133 are connected to each other through a shaft 143. The electric machine 134 drives one of the driving sprockets 133 to rotate, which can drive the two chains 131 to move synchronously.

Figure 14:
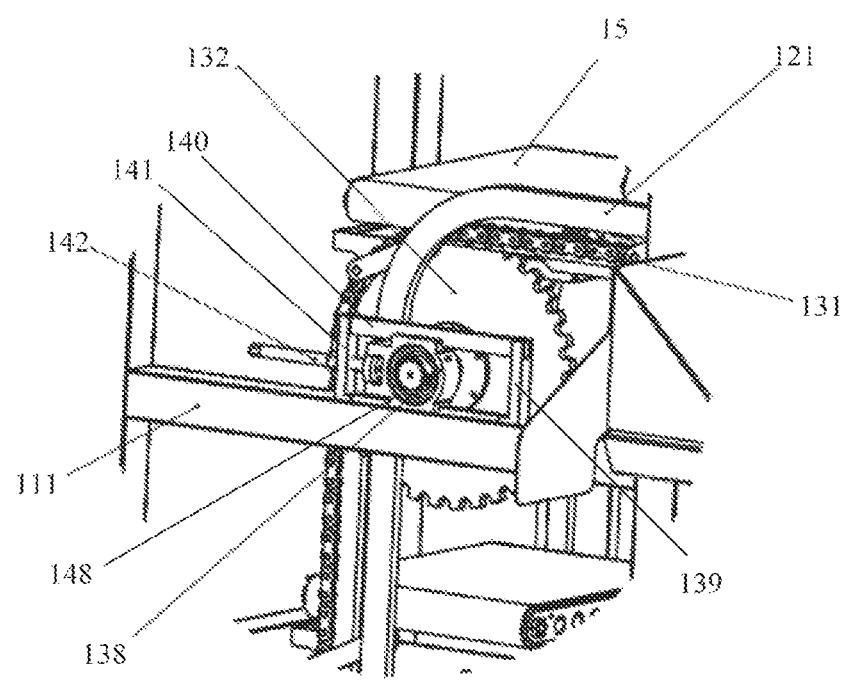
FIG. 14 is a partial enlarged view of a sorter according to an exemplary embodiment.

Further, referring to FIG. 14, the sprocket set 149 further includes a plurality of bearing seats 138 and a plurality of third bearings 148. The plurality of bearing seats 138 are all provided on the frame 111. At least one third bearing 148 is installed in each bearing seat 138. Rotating shafts of the driven sprocket 132 and the driving sprockets 133 are inserted into an inner ring of the third bearing 148.

Furthermore, the sprocket set 149 further includes a tensioning member 139. The tensioning member 139 is fixed on the frame 111. The tensioning member 139 includes two straight sliding tracks 140, a connecting member 141 and a tensioning bolt 142. The straight sliding track 140 has a shape of a straight strip and is arranged horizontally. The straight slide track 140 is parallel to the transverse track 123. The connecting member 141 is arranged in a strip shape and may extend in a vertical direction. The connecting member 141 is arranged at one end of the two straight sliding tracks 140. The connecting member 141 is connected to ends of the two straight sliding tracks 140. In each sprocket set 149, at least one bearing seat 138 with the driven sprocket 132 installed is disposed between two straight sliding tracks 140. Two strip grooves are provided on both sides of the bearing seat 138, and the two straight slide tracks 140 are respectively embedded into the two strip grooves, so that the bearing seat 138 can slide along the straight slide track 140. The connecting member 141 is provided with a screw hole, and the screw hole may be arranged in the middle of the connecting member 141. The tensioning bolt 142 is inserted into the screw hole and threaded fitted with the screw hole. The end of the tensioning bolt 142 is rotatable connected to the bearing seat 138. The tensioning bolt 142 can rotate around its own axis, and the tensioning bolt 142 and the bearing seat 138 cannot move relative to each other in the radial direction. The tensioning bolt 142 and the bearing seat 138 may be connected by a bearing.

When rotating the tensioning bolt 142, the tensioning bolt 142 can drive the bearing seat 138 to slide along the straight slide tracks 140, and the driven sprocket in turn follow the bearing seat 138 to move, so that the tightness of the chain 131 can be adjusted.

Further, the sorter 1 further includes a plurality of sliding chutes 18. The sliding chute 18 is arranged on a side of the ring-shaped track 121 facing away from the sorting cart 15. The bottom surface of the sliding chute 18 is inclined, and a side close to the ring-shaped track 121 has a higher height. A partition is arranged between two adjacent sliding chutes 18. A cargo basket can be provided at the end of each sliding chute 18. After the sorting car 15 puts packages into the sliding chute 18, the sliding chute 18 can guide the packages into corresponding cargo baskets. Of course, a conveyor line can also be provided at the end of the sliding chute 18 to transport the sorted packages.

Further, the sorter 1 also includes a platform 17. The platform 17 includes a tot) plate 171, upright posts 172 and ladders 173. The top plate 171 is arranged horizontally and passes through a central part enclosed by two ring-shaped tracks 121, as shown in FIG. 1. The upright posts 172 are provided on edges of the top plate 171, respectively, to support the top plate 171. The ladders 173 are built on the edges of the top plate 171, respectively.

The cargo basket can be placed above the top plate 171 in order to receive the packages slid down from the top sliding chute 18. The staff can also go up and down the top plate 171 along the ladder 173 to facilitate work.

Further, there are lots of sorting carts 15. The plurality of sorting carts 15 are arranged on the ring-shaped track 121 in sequence and the ring-shaped track 121 is full of the plurality of sorting carts 15. The ring-shaped track 121 is full of sorting carts 15, which can improve the sorting efficiency.

The technical solution provided by the embodiments of the present disclosure may include the following advantages and beneficial effects: the sorter is arranged in a vertical ring shape as a whole, which makes full use of the upper space, and has a smaller footprint than the existing ring-type cross-belt sorter; and the sorting car to maintain a fixed posture because of the limitation of the chains and ring-shaped tracks, to make the sorting car always maintain the same posture during operation without turning over. Furthermore, the sorting car can carry packages and run along the entire ring-shaped tracks, it is not necessary to unload the packages at the tail end, and the overall utilization rate is improved, compared with the existing linear cross-belt sorter.

Although the present disclosure has been disclosed with reference to certain embodiments, various variations and modifications can be made to the described embodiments without departing from the scope and scope of the present disclosure. Therefore, it should be understood that the present disclosure is not limited to the illustrated embodiments, and its protection scope should be defined by the content of the appended claims and their equivalent structures and solutions.

What is claimed is:

1. A sorter, comprising:
    a rack (11);
    a track assembly (12) comprising two ring-shaped tracks (121) both installed on the rack (11), the two ring-shaped tracks (121) being respectively arranged in two mutually parallel vertical planes and being aligned with each other;
    a drive assembly (13), comprising:
        at least one sprocket set (149) comprising a driving sprocket (133) and a plurality of driven sprockets (132) installed on the rack (11);
        at least one chain (131) hooping on the driving sprocket (133) and the plurality of driven sprockets (132) and consistent with a shape of the ring-shaped tracks (121);
        an electric machine (134) configured to drive the driving sprocket (133) to rotate;
    a sorting cart (15), comprising:
        a carriage (152) arranged between the two ring-shaped tracks (121) and slidably connected to the two ring-shaped tracks (121), and being further hinged with the at least one chain (131);
        a conveying assembly (151) disposed above the carriage (152) and configured to carry and convey packages;
    wherein a conveying direction of the conveying assembly (151) is different from a moving direction of the sorting cart (15);
    wherein the carriage (152) comprises a carriage body (156) that carries the conveying assembly (151) and at least two support arms (157) that respectively arranged on both sides of the carriage body (156),
    wherein each of the support arms (157) comprises:
    a guide-wheel group (160);
    a hinge rod (159) extends from a side of the carriage body (156) in a direction away from the carriage body (156); and
    a connecting rod (158) having one end connected to the hinge rod (159) and other end connected to the guide-wheel group (160), and being perpendicular to the hinge rod (159);
    wherein said two guide-wheel groups (160) respectively travel along the two ring-shaped tracks (121), the hinge rod (159) passes through the at least one chain (131) and rotates relative to the at least one chain (131), and the at least one chain (131) drives the carriage (152) to slide along the ring-shaped tracks (121) by pulling the hinge rod (159).

2. The sorter according to claim 1, wherein the at least one chain (131) is located between the two ring-shaped tracks (121) and in a vertical plane parallel to the two ring-shaped tracks (121).

3. The sorter according to claim 2, wherein the carriage (152) comprises a carriage body (156) that carries the conveying assembly (151) and at least two support arms (157) that respectively arranged on both sides of the carriage body (156),
    wherein each of the support arms (157) comprises:
        a guide-wheel group (160);
        a hinge rod (159) extends from a side of the carriage body (156) in a direction away from the carriage body (156); and
        a connecting rod (158) having one end connected to the hinge rod (159) and other end connected to the guide-wheel group (160), and being perpendicular to the hinge rod (159);
    wherein said two guide-wheel groups (160) respectively travel along the two ring-shaped tracks (121), the hinge rod (159) passes through the at least one chain (131) and rotates relative to the at least one chain (131), and the at least one chain (131) drives the carriage (152) to slide along the ring-shaped tracks (121) by pulling the hinge rod (159).

4. The sorter according to claim 3, wherein,
    two sets of the at least one sprocket set (149) are provided and two chains of the at least one chain (131) are provided;
    the two chains (131) are respectively arranged on the two sets of sprocket set (149), and are respectively located on two sides of the carriage body (156);

each of two hinge rods (159) passes through a corresponding chain (131), and rotates relative to the corresponding chain (131) that it passes through;

the two chains (131) synchronously and respectively pull the two hinge rods (159) to drive the carriage (152) to slide along the ring-shaped tracks (121).

5. The sorter according to claim 1, wherein, two sets of the at least one sprocket set (149) are provided and two chains of the at least one chain (131) are provided;

the two chains (131) are respectively arranged on the two sets of sprocket set (149), and are respectively located on two sides of the carriage body (156);

each of two hinge rods (159) passes through a corresponding chain (131), and rotates relative to the corresponding chain (131) that it passes through;

the two chains (131) synchronously and respectively pull the two hinge rods (159) to drive the carriage (152) to slide along the ring-shaped tracks (121).

6. The sorter according to claim 5, wherein the driven sprockets (132) in the two sets of sprocket set (149) are aligned with each other;

the driving sprockets (133) in the two sets of sprocket set (149) are aligned with each other, and two driving sprockets (133) share a shaft (143).

7. The sorter according to claim 1, wherein the hinge rod (159) connects two adjacent chain links in the at least one chain (131).

8. The sorter according to claim 1, wherein each of the two ring-shaped tracks (121) is provided with a ring-shaped strip groove (125) with openings facing each other;

the guide-wheel group (160) comprises a first guide-wheel (161) and a second guide-wheel (162) that are coaxially arranged;

wherein, the first guide-wheel (161) rolls along an upper guide wall (126) of the ring-shaped strip groove (125), and the second guide-wheel (162) rolls along a lower guide wall (127) of the ring-shaped strip groove (125).

9. The sorter according to claim 8, wherein a diameter of the first guide-wheel (161) is greater than a diameter of the second guide-wheel (162), and a height of the lower guide wall (127) of the ring-shaped strip groove (125) is smaller than a height of the upper guide wall (126) of the ring-shaped strip groove (125) so that the lower guide wall (127) gives a place to the first guide-wheel (161).

10. The sorter according to claim 1, wherein the drive assembly (13) further comprises a first pallet (136) that has a shape of a straight strip and extends in a horizontal direction, and the first pallet (136) is arranged below a horizontally extending portion of the chain (131).

11. The sorter according to claim 1, wherein the drive assembly (13) further comprises a second pallet (137) that has a shape of a straight strip and extends in a vertical direction, and the second pallet (137) is arranged on an inner side of a vertically extending portion of the chain (131).

12. The sorter according to claim 1, wherein the rack (11) comprises two frames (111) separated from each other;

wherein two sides of ring-shaped tracks (121) are respectively installed on the two frames (111), and sprockets in the sprocket set (149) are evenly distributed on the two frames (111).

13. The sorter according to claim 1, wherein the sprocket set (149) further comprises a tensioning member (139) installed on the frame, a bearing seat (138) installed on the tensioning member (139), and a third bearing (148) installed on the bearing seat (138);

wherein a rotating shaft of at least one driven sprocket (132) is inserted into an inner ring of the third bearing (148);

wherein the tensioning member (139) comprises:

two straight sliding tracks (140) parallel to each other, the bearing seat (138) being disposed between the two straight sliding tracks (140) and slide along the straight sliding tracks (140);

a connecting member (141) having a screw hole, and the connecting member (141) configured to connect the two straight sliding tracks (140);

a tensioning bolt (142) parallel to the straight sliding tracks (140), the tensioning bolt (142) being threaded fitted with the screw hole and being rotatable connected to the bearing seat (138).

14. The sorter according to claim 1, wherein a plurality of sorting carts (15) are disposed; and the ring-shaped tracks (121) are full of the plurality of sorting carts (15).

15. The sorter according to claim 1, wherein the sorter (1) further comprises a plurality of sliding chutes arranged on a side of the ring-shaped tracks (121) facing away from the sorting cart (15); and the plurality of sliding chutes (18) are arranged along a extending direction of the ring-shaped tracks (121).

16. The sorter according to claim 1, wherein the sorter (1) further comprises a platform (17), the platform (17) comprises a top plate (171), upright posts (172) and ladders (173), wherein the top plate (171) is arranged horizontally and passes through a central part enclosed by two ring-shaped tracks (121).

\* \* \* \* \*